(12) United States Patent
Golding

(10) Patent No.: US 7,100,073 B2
(45) Date of Patent: Aug. 29, 2006

(54) GROUPED-OBJECT RAID

(75) Inventor: Richard Andrew Golding, San Francisco, CA (US)

(73) Assignee: International Business Machines Corporation, Armonk, NY (US)

( * ) Notice: Subject to any disclaimer, the term of this patent is extended or adjusted under 35 U.S.C. 154(b) by 467 days.

(21) Appl. No.: 10/751,810

(22) Filed: Jan. 5, 2004

(65) Prior Publication Data

US 2005/0160309 A1 Jul. 21, 2005

(51) Int. Cl.
*G06F 11/00* (2006.01)
(52) U.S. Cl. ............................... 714/6; 711/114
(58) Field of Classification Search ............ None
See application file for complete search history.

(56) References Cited

U.S. PATENT DOCUMENTS

| | | | |
|---|---|---|---|
| 5,948,110 A | 9/1999 | Hitz et al. | |
| 5,960,169 A | 9/1999 | Styczinski | |
| 6,038,570 A | 3/2000 | Hitz et al. | |
| 6,480,969 B1 | 11/2002 | Hitz et al. | |
| 6,934,804 B1* | 8/2005 | Hashemi | 711/114 |
| 6,985,995 B1* | 1/2006 | Holland et al. | 711/114 |
| 7,047,359 B1* | 5/2006 | Van Krevelen et al. | 711/114 |
| 2002/0166079 A1 | 11/2002 | Ulrich et al. | |
| 2002/0178162 A1 | 11/2002 | Ulrich et al. | |
| 2002/0194526 A1 | 12/2002 | Ulrich et al. | |

FOREIGN PATENT DOCUMENTS

| | | |
|---|---|---|
| JP | 8030400 A | 2/1996 |
| WO | WO0229539 A2 | 4/2002 |

OTHER PUBLICATIONS

G.Gibson et al., "A Cost-Effective, High-Bandwidth Storage Architecture," ASPLOS VIII, Oct. 1998, 1998 ACM 1058113-107-0/98/0010, pp. 92-103.
J. Wilkes et al., "The HP AutoRAID hierarchical storage system," SIGOPS '95 Dec. 1995, 1995 ACM 0-89791-715-4/95/0012, pp. 96-108.
J. Wilkes et al., "The HP AutoRAID Hierarchical Storage System," ACM Transactions on Computer Systems, vol. 14, No. 1, Feb. 1996, pp. 108-127.

* cited by examiner

*Primary Examiner*—Robert Beausoliel
*Assistant Examiner*—Yolanda L Wilson
(74) *Attorney, Agent, or Firm*—Joseph P. Curtin, L.L.C.

(57) ABSTRACT

A RAID-configured grouped-object storage system provides reduced storage space overhead for small objects. The storage system includes a plurality stripes arranged across a plurality of physical objects. Each stripe includes a plurality of storage blocks that are each mapped on to a respectively different physical object. The storage system also includes a plurality of virtual objects each containing at least one storage block. A group of virtual objects is formed when a virtual object contains less storage blocks than the number of stripes by associating the virtual object with at least one virtual object containing less storage blocks than the number of stripes and/or at least one storage block containing zero values so that the storage blocks of each group of virtual objects equals the number of stripes. The storage blocks of each virtual object and of each group of virtual objects are mapped to a respectively different stripe.

20 Claims, 4 Drawing Sheets

GROUPED-OBJECT RAID

BACKGROUND OF THE INVENTION

1. Field of the Invention

The present invention relates to storage systems. More particularly, the present invention relates to object-based storage systems providing redundancy-based protection.

2. Description of the Related Art

A conventional object-based storage system provides an interface for arbitrarily-named data objects that are a combination of application (file) data and storage attributes (metadata). The metadata specifies on a per-file basis such parameters as data layout and usage information; a RAID level of protection and other information for ensuring a Quality of Service (QoS). A specified RAID level for a distributed object-based storage system is conventionally provided by creating several physical objects on multiple object storage devices (OSDs). An OSD is a storage unit that holds a set of objects in which each object is identified by a number (or an abstract identifier) and contains a variable number of bytes or blocks. In contrast, a block storage device, such as a conventional tape or Hard Disk Drive (HDD), presents as number of fixed-sized blocks that are each addressed by a sequential number. The physical objects of an object-based storage system are used as containers and virtual objects are mapped onto the physical objects to form a layout for the specified RAID level. Most virtual objects are relatively small in size. Consequently, the storage space overhead is relatively high.

FIG. 1 depicts an exemplary conventional RAID level 1 layout and a mapping from a virtual object 100 to physical objects 101 and 102. Virtual object 100 includes blocks A–n, in which block A is the first block and block n is the last block of virtual object 100. The mapping of virtual object 100 to physical objects 101 and 102 results in a two-way mirrored layout having a 50% storage overhead.

Other RAID layouts can be used for virtual objects. For example, FIGS. 2A and 2B respectively depict a virtual object 200 and a conventional mapping of virtual object 200 to physical objects 201–204 to form an exemplary RAID level 5 layout. Virtual object 200 includes blocks A–n, in which block A is the first block and block n is the last block of virtual object 200. The blocks of virtual object 200 are mapped into physical objects 201–203 so that physical object 201 includes blocks A, D, G and so on; physical object 202 includes blocks B, E, H and so on; and physical object 203 includes blocks C, F, I and so on.

RAID level 5 layouts typically have a storage overhead of approximately $$\frac{1}{(\text{stripe width})},\quad (1)$$

in which a stripe width is the number of blocks forming one horizontal stripe. For example, the stripe width in FIG. 2 is four. The overhead for the layout shown in FIG. 2 is 25%, that is, ¼. The overhead would accordingly be 10% for a RAID level 5 layout having a stripe width of 10 blocks.

When using a RAID level 5 and other similar redundant-type layouts for small virtual objects, however, the layout degenerates into mirrored storage, similar to the configuration shown in FIG. 1. For example, when a virtual object is only about the size of one stripe unit, then the stripe becomes one data block and one parity block. The parity block is identical to the data block, thus resulting in mirroring with a 50% overhead. Similarly, when a virtual object is only about two blocks in size, then the overhead is 33%.

Consequently, what is needed is a technique to reduce storage space overhead when an object-based RAID configuration is used for small objects.

BRIEF SUMMARY OF THE INVENTION

The present invention provides a technique to reduce storage space overhead when an object-based RAID configuration is used for small objects.

The advantages of the present invention are provided by a grouped-object storage system having a plurality of physical objects, which are stored on object storage devices (OSDs), and a first predetermined number of stripes arranged across the plurality of physical objects. Each stripe contains a second predetermined number of storage blocks, such that the second predetermined number of storage blocks in each stripe corresponds to the number of physical objects of the plurality of physical objects. One storage block of the second predetermined number of storage blocks in a stripe contains redundancy information for the stripe, and the storage block containing redundancy information for a stripe and each other storage block of the stripe are mapped on to a respectively different physical object. The grouped-object storage system also includes a plurality of virtual objects. Each virtual object contains between one and first predetermined number of storage blocks. A group of virtual objects is formed when a virtual object contains less than the first predetermined number of storage blocks by associating the virtual object with at least one of at least one virtual object containing less than the first predetermined number of storage blocks and at least one storage block containing zero values so that each group of virtual objects contains the first predetermined number of storage blocks. The storage blocks of each virtual object containing the predetermined number of storage blocks are mapped to a respectively different stripe. Similarly, the storage blocks of each group of virtual objects are mapped to a respectively different stripe. According to one aspect of the present invention, each virtual object is the same size. Alternatively, at least one virtual object is a size that is different from the size of at least one other virtual object. Moreover, the grouped-object storage system can be configured to have RAID level 5 protection. Alternatively, the grouped-object storage system is configured to have RAID level 6 protection. Further, the OSDs on which the physical objects are stored can be implemented as tape drives, Random Access Memory (RAM) storage devices (both volatile and non-volatile), optical storage devices, and/or HDDs.

The present invention also provides a method of forming a grouped-object storage system in which a plurality of physical objects is formed. A first predetermined number of stripes are arranged across the plurality of physical objects. Each stripe contains a second predetermined number of storage blocks such that the second predetermined number of storage blocks in each stripe corresponds to a number of physical objects of the plurality of physical objects. One storage block of the second predetermined number of storage blocks in a stripe contains redundancy information for the stripe. The storage block containing redundancy information for a stripe and each other storage block of the stripe are mapped on to a respectively different physical object. A plurality of virtual objects is formed such that each virtual object contains between one and first predetermined number of storage blocks. A group of virtual objects is formed when a virtual object contains less than the first predetermined number of storage blocks by associating the virtual object with at least one of at least one virtual object containing less than the first predetermined number of storage blocks and at least one storage block containing zero values so that each group of virtual objects contains the first predetermined number of storage blocks. The storage blocks of each virtual object containing the predetermined number of storage blocks are mapped to a respectively different stripe. Similarly, the storage blocks of each group of virtual objects are mapped to a respectively different stripe.

BRIEF DESCRIPTION OF THE DRAWINGS

The present invention is illustrated by way of example and not by limitation in the accompanying figures in which like reference numerals indicate similar elements and in which.

DETAILED DESCRIPTION OF THE INVENTION

The present invention provides a technique to reduce storage space overhead when an object-based RAID configuration is used for small objects. In a situation when a small object does not provide a sufficient number of blocks to adequately amortize the parity overhead, the present invention provides that several small objects are grouped together in order to provide sufficient amortization of the parity overhead.

Figure 1:
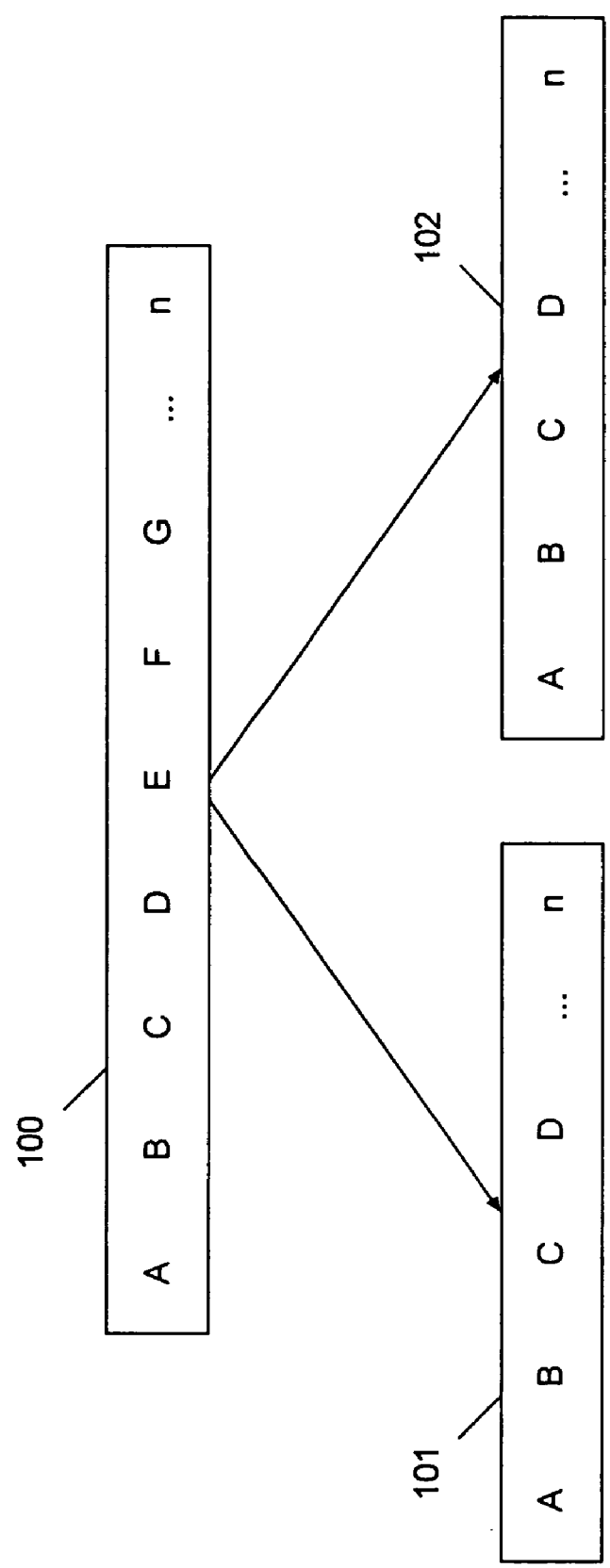
FIG. 1 depicts an exemplary conventional RAID level 1 layout and a mapping from a virtual object to two physical objects.
Figure 2A:
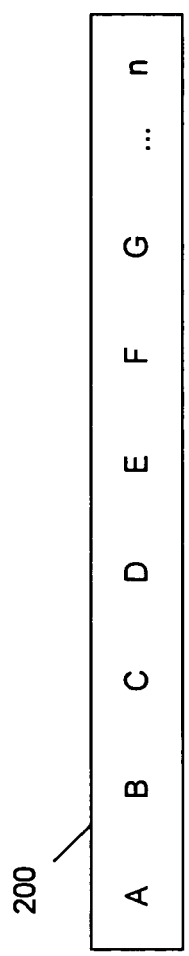
FIGS. 2A and 2B respectively depict a virtual object and a conventional mapping from the virtual object to physical objects for an exemplary RAID level 5 layout.
Figure 2B:
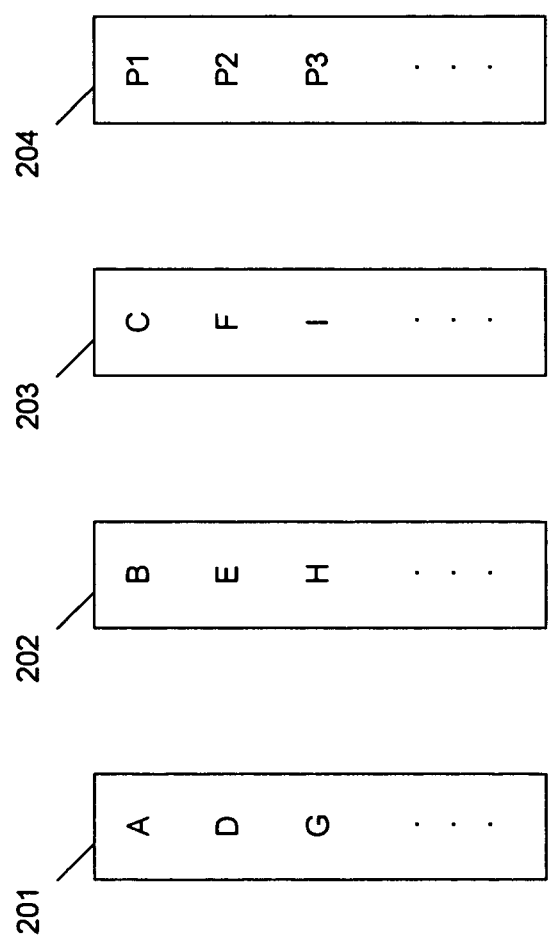
Figure 3A:
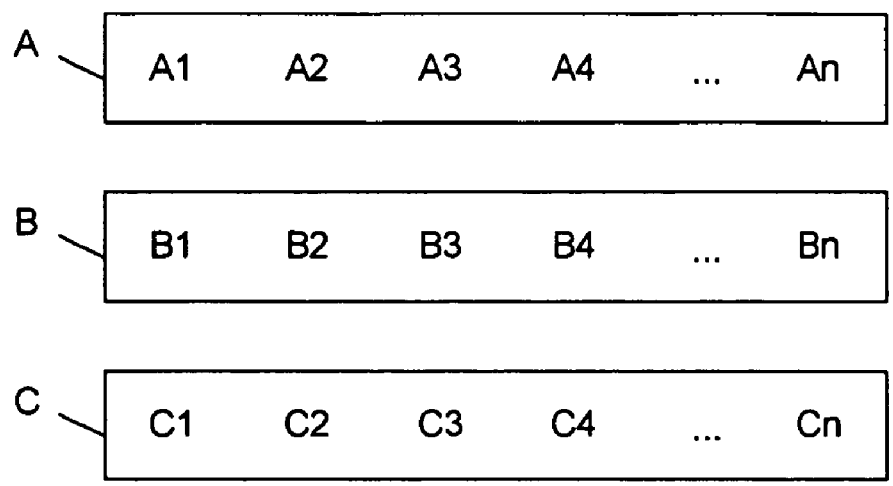
FIGS. 3A and 3B respectively depict three virtual object and a mapping from the virtual objects to physical objects for an exemplary RAID level 5 layout according to the present invention.
Figure 3B:
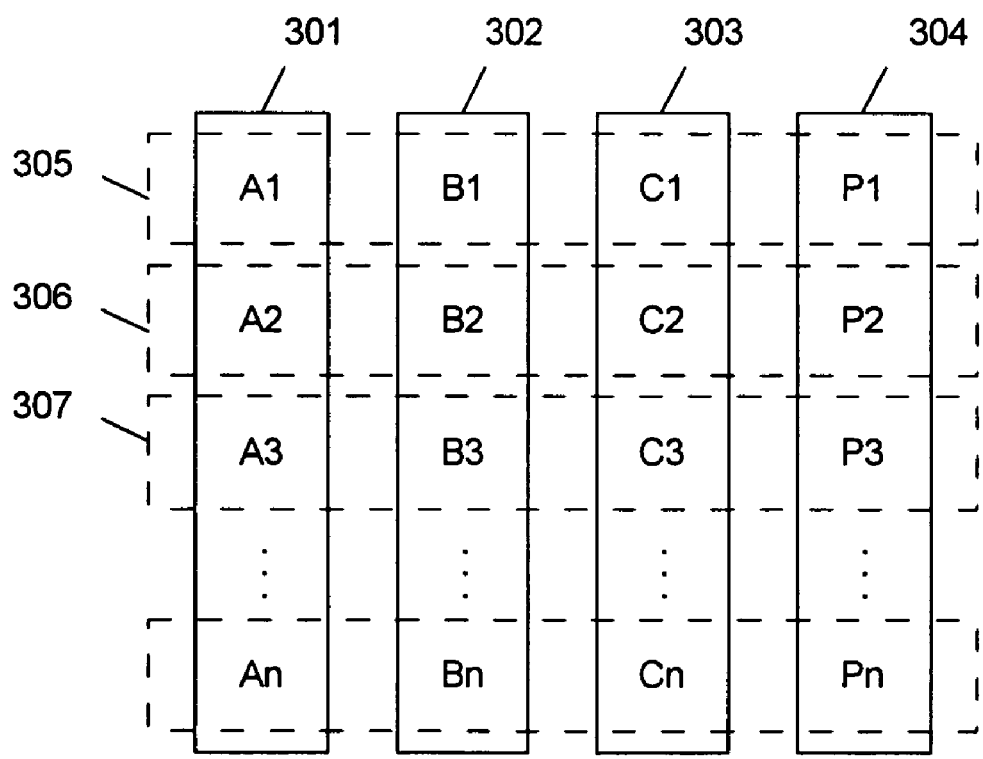

FIGS. 3A and 3B respectively depict three virtual objects A–C and a mapping from the virtual objects A–C to physical objects 301–304 for an exemplary RAID level 5 layout according to the present invention. Virtual object A includes blocks A1–An. Similarly, virtual object B includes blocks B1–Bn, and virtual object C includes blocks C1–Cn. The data blocks in the first stripe 305 are the first blocks in each of the virtual objects in the group. The data blocks in the second stripe 306 are the second blocks in each virtual object. The data blocks in the third stripe 307 are the third blocks in each virtual object, and so on.

In FIG. 3B, the parity block P1 in stripe 305 has value $$P1 = A1 \oplus B1 \oplus C1. \tag{2}$$

In the exemplary mapping shown in FIG. 3B, the three virtual objects A–C that are grouped together have the same length. Consequently, the overhead is 25%. Accordingly, when nine virtual objects are grouped, the overhead is 10%. In general, as long as the objects are all the same length, the overhead is $$\frac{1}{(1 + \text{number of objects})}. \tag{3}$$

The number of virtual objects in a group can be changed. Another object can be added to a group by adjusting the value of each parity block. Similarly, an object can be removed from a group by recalculating each parity block to exclude the data that has been removed. In FIGS. 3A and 3B, virtual object C could be removed. Consequently, the parity for the second stripe would be recalculated as $$P2 = A2 \oplus B2. \tag{4}$$

Note that $$P2_{NEW} = P2_{OLD} \oplus C2. \tag{5}$$

Typically, the number of stripes is equal to the number of blocks in the longest virtual object, ignoring the possibility of "holes" in an object. When one virtual object has fewer blocks than the number of stripes in the RAID group, then, according to the present invention, the object is virtually padded with zero values as far as parity calculations are concerned. For example, FIGS. 4A and 4B respectively depict three virtual objects A, B' and C, and a mapping from virtual objects A, B' and C to physical objects 401–404 for an exemplary RAID level 5 layout according to the present invention. Virtual object A includes blocks A1–An and virtual object C includes blocks C1–Cn. Virtual object B' is a different size from virtual objects A and C and includes only a single block B1'.

Figure 4A:
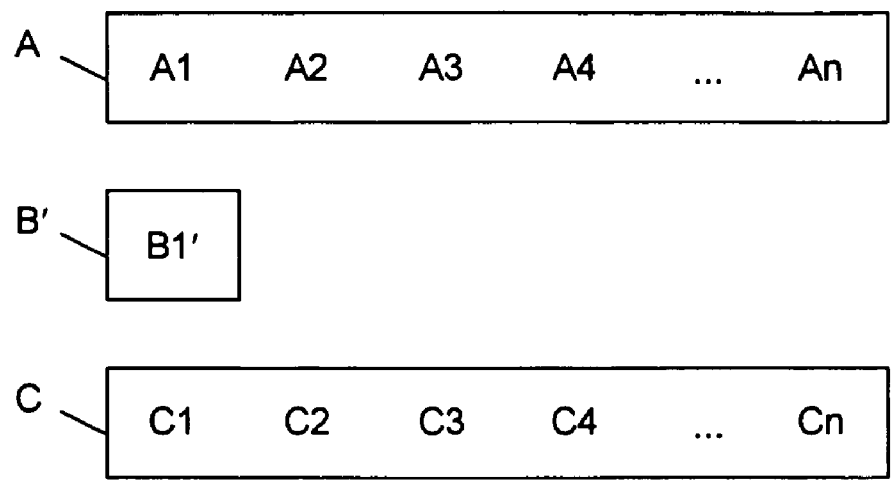
FIGS. 4A and 4B respectively depict three virtual objects, one of which is a different size from the other two, and a mapping from the virtual objects to physical objects for an exemplary RAID level 5 layout according to the present invention.
Figure 4B:
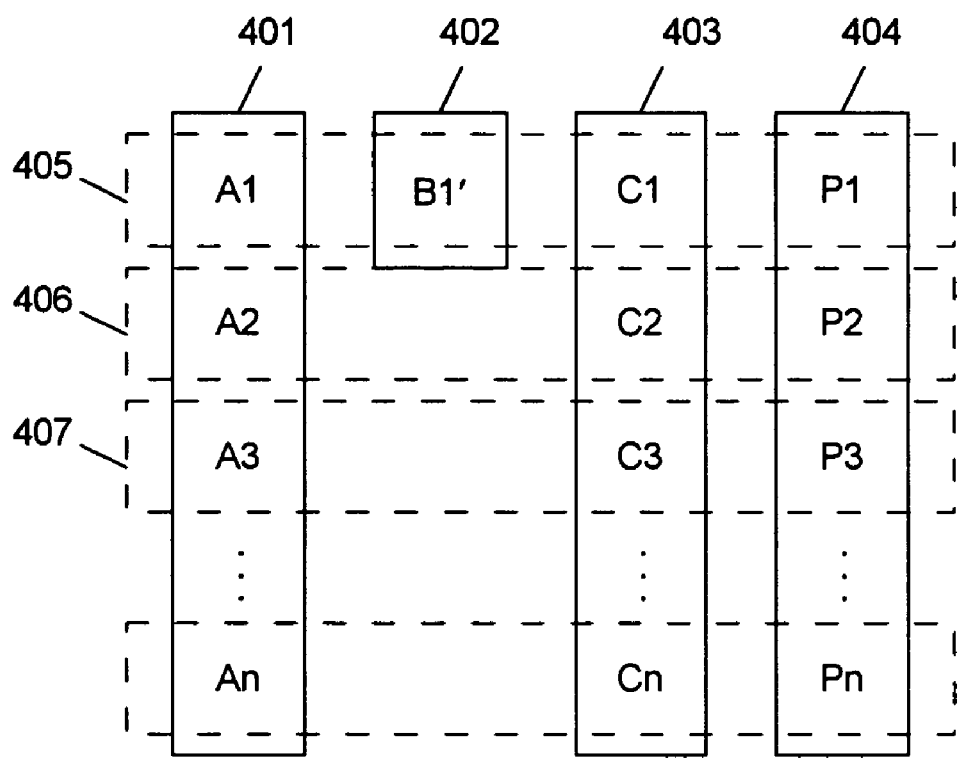

For the mapping shown in FIG. 4B, parity block P1 for the first stripe 405 is $$P1 = A1 \oplus B1' \oplus C1. \tag{6}$$

Parity block P2 for the second stripe 406 is:

$$P2 = A2 \oplus 0 \oplus C2 = A2 \oplus C2. \tag{7}$$

When virtual objects are of different lengths, as is depicted in FIGS. 4A and 4B, the storage overhead is higher. If, in FIGS. 4A and 4B, virtual objects A and C were significantly larger than virtual object B', the overhead would be very close to 33%. If virtual object B' had been the same size as virtual objects A and C, the overhead would have been only 25%.

Generally, the present invention provides a relatively low overhead when all the objects are about the same length. The technique of the present invention, nevertheless, provides an optimal overhead when objects are significantly different lengths. In a worst case, the overhead will be no greater than 50% for RAID level 5 layouts.

While the present invention has been described in terms of a RAID level 5 layout, the present invention applies to other parity- and code-protected redundancy schemes, such as RAID level 6. Moreover, while the present invention has been described in terms of object storage devices, the present invention can apply to other types of storage devices, including storage devices formed from HDDs, Random Access Memory (RAM) storage devices (both volatile and non-volatile), tape or optical storage devices. Additionally, the present invention is suitable to virtualized storage systems, such as arrays built out of network-attached storage.

Although the foregoing invention has been described in some detail for purposes of clarity of understanding, it will be apparent that certain changes and modifications may be practiced that are within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A grouped-object storage system, comprising:
   a plurality of physical objects;
   a first predetermined number of stripes arranged across the plurality of physical objects, each stripe containing a second predetermined number of storage blocks, the second predetermined number of storage blocks in each stripe corresponding to a number of physical objects of the plurality of physical objects, one storage block of the second predetermined number of storage blocks in a stripe containing redundancy information for the stripe, the storage block containing redundancy information for a stripe and each other storage block of the stripe being mapped on to a respectively different physical object; and
   a plurality of virtual objects, each virtual object containing between one and first predetermined number of storage blocks, a group of virtual objects being formed when a virtual object contains less than the first predetermined number of storage blocks by associating the virtual object with at least one of at least one virtual object containing less than the first predetermined number of storage blocks and at least one storage block containing zero values so that each group of virtual objects contains the first predetermined number of storage blocks, the storage blocks of each virtual object containing the predetermined number of storage blocks being mapped to a respectively different stripe, and the storage blocks of each group of virtual objects being mapped to a respectively different stripe.

2. The grouped-object storage system according to claim 1, wherein each virtual object is a same size.

3. The grouped-object storage system according to claim 1, wherein at least one virtual object is a size that is different from a size of at least one other virtual object.

4. The grouped-object storage system according to claim 1, wherein the grouped-object storage system is configured to have RAID level 5 protection.

5. The grouped-object storage system according to claim 1, wherein the grouped-object storage system is configured to have RAID level 6 protection.

6. The grouped-object storage system according to claim 1, wherein the physical objects are stored on a plurality of object storage devices.

7. The grouped-object storage system according to claim 6, wherein at least one object storage device is a tape drive.

8. The grouped-object storage system according to claim 6, wherein at least one object storage device is a random access memory device.

9. The grouped-object storage system according to claim 6, wherein at least one object storage device is an optical storage drive.

10. The grouped-object storage system according to claim 6, wherein at least one object storage device is a hard disk drive.

11. A method of forming a grouped-object storage system, the method comprising:
    forming a plurality of physical objects;
    arranging a first predetermined number of stripes across the plurality of physical objects, each stripe containing a second predetermined number of storage blocks, the second predetermined number of storage blocks in each stripe corresponding to a number of physical objects of the plurality of physical objects, one storage block of the second predetermined number of storage blocks in a stripe containing redundancy information for the stripe, the storage block containing redundancy information for a stripe and each other storage block of the stripe being mapped on to a respectively different physical object;
    forming a plurality of virtual objects, each virtual object containing between one and first predetermined number of storage blocks;
    forming a group of virtual objects when a virtual object contains less than the first predetermined number of storage blocks by associating the virtual object with at least one of at least one virtual object containing less than the first predetermined number of storage blocks and at least one storage block containing zero values so that each group of virtual objects contains the first predetermined number of storage blocks;
    mapping the storage blocks of each virtual object containing the predetermined number of storage blocks to a respectively different stripe; and
    mapping the storage blocks of each group of virtual objects to a respectively different stripe.

12. The method according to claim 11, wherein each virtual object is a same size.

13. The method according to claim 11, wherein at least one virtual object is a size that is different from a size of at least one other virtual object.

14. The method according to claim 11, further comprising configuring the grouped-object storage system to have RAID level 5 protection.

15. The method according to claim 11, further comprising configuring the grouped-object storage system to have RAID level 6 protection.

16. The method according to claim 11, further comprising storing the physical objects on a plurality of object storage devices.

17. The method according to claim 16, wherein at least one object storage device is a tape drive.

18. The method according to claim 16, wherein at least one object storage device is a random access memory device.

19. The method according to claim 16, wherein at least one object storage device is an optical storage drive.

20. The method according to claim 16, wherein at least one object storage device is a hard disk drive.

* * * * *